US008341152B1

(12) United States Patent
Bates

(10) Patent No.: US 8,341,152 B1
(45) Date of Patent: Dec. 25, 2012

(54) SYSTEM AND METHOD FOR ENABLING OBJECTS WITHIN VIDEO TO BE SEARCHED ON THE INTERNET OR INTRANET

(75) Inventor: Daniel L. Bates, Manhattan Beach, CA (US)

(73) Assignee: Creatier Interactive LLC, Los Angeles, CA (US)

( * ) Notice: Subject to any disclaimer, the term of this patent is extended or adjusted under 35 U.S.C. 154(b) by 0 days.

(21) Appl. No.: 11/519,267

(22) Filed: Sep. 12, 2006

(51) Int. Cl.
*G06F 7/00* (2006.01)
*G06F 17/30* (2006.01)

(52) U.S. Cl. .................. 707/736; 707/706; 707/722

(58) Field of Classification Search .............. 707/706, 707/736, 722
See application file for complete search history.

(56) References Cited

U.S. PATENT DOCUMENTS

| 5,517,605 | A | 5/1996 | Wolf |
| 5,659,742 | A | 8/1997 | Beattle et al. |
| 5,729,741 | A | 3/1998 | Liaguno et al. |
| 5,751,286 | A | 5/1998 | Barber et al. |
| 5,794,249 | A | 8/1998 | Orsolini et al. |
| 5,819,286 | A | 10/1998 | Yang et al. |
| 5,893,110 | A | 4/1999 | Weber et al. |
| 5,987,454 | A | 11/1999 | Hobbs |
| 6,067,401 | A | 5/2000 | Abecassis |
| 6,070,161 | A | 5/2000 | Higashio |
| 6,161,108 | A | 12/2000 | Ukigawa et al. |
| 6,397,181 | B1 | 5/2002 | Li et al. |
| 6,457,018 | B1 | 9/2002 | Rubin |
| 6,493,707 | B1 | 12/2002 | Dey et al. |
| 6,603,921 | B1 | 8/2003 | Kanevsky et al. |
| 6,642,940 | B1 | 11/2003 | Dakss et al. |
| 6,697,796 | B2 | 2/2004 | Kermani |

(Continued)

OTHER PUBLICATIONS

Shih-Fu Chang et al., A Fully Automated Content-Based Video Search Engine Supporting Spatiotemporal Queries, Sep. 1998, IEEE, vol. 8 No. 5, pp. 602-615.*

*Primary Examiner* — Apu Mofiz
*Assistant Examiner* — Jared Bibbee
(74) *Attorney, Agent, or Firm* — Katten Muchin Rosenman LLP

(57) ABSTRACT

A method and system for generating and linking keywords to objects in videos, and then providing an internet searchable web page is disclosed. The objects also may be associated with hyperlinks to further information, further objects, or further videos or web pages. First, objects within a video are selected. Then software for tracking the objects throughout a video is used to determine in which frames the object appears. Data corresponding all frames in which the object first appears and last appears is determined. Second, an object descriptor term or phrase is associated with the object. The object descriptor is then used to generate a set of keywords, which along with the object descriptor, are stored in memory in association with the object and video, preferably an XML file or other format. Then, the keywords or keyword phrases are converted to a search engine searchable computer language, e.g., HTML, CSS, and posted to a web page. When a user searches the internet using a search term that sufficiently matches, in accordance with the search engine's search strategy, keywords (or the object descriptor itself which should be included in the set of searchable keywords in a searchable language) that are associated with an object in a video, the results will include a listing with a link to the video or videos at the video segment in which the object appears. The video thus can start playing at the first frame the object appears in and may end at the last frame the object appears in.

23 Claims, 8 Drawing Sheets

U.S. PATENT DOCUMENTS

| | | | |
|---|---|---|---|
| 6,741,655 B1 | 5/2004 | Chang et al. | |
| 6,819,797 B1 | 11/2004 | Smith et al. | |
| 6,859,799 B1 | 2/2005 | Yuen | |
| 6,925,474 B2 | 8/2005 | McGrath et al. | |
| 6,990,448 B2 | 1/2006 | Charlesworth et al. | |
| 7,003,156 B1 | 2/2006 | Yamamoto et al. | |
| 7,020,192 B1 | 3/2006 | Yamaguchi et al. | |
| 7,024,020 B2 | 4/2006 | Lee et al. | |
| 7,032,182 B2 | 4/2006 | Prabhue et al. | |
| 7,054,812 B2 | 5/2006 | Charlesworth et al. | |
| 7,240,075 B1* | 7/2007 | Nemirofsky et al. | 1/1 |
| 2001/0018771 A1* | 8/2001 | Walker et al. | 725/91 |
| 2002/0069218 A1* | 6/2002 | Sull et al. | 707/501.1 |
| 2002/0087530 A1 | 7/2002 | Smith et al. | |
| 2002/0163532 A1* | 11/2002 | Thomas et al. | 345/723 |
| 2003/0122860 A1 | 7/2003 | Ino | |
| 2004/0215660 A1 | 10/2004 | Ikeda | |
| 2005/0022107 A1 | 1/2005 | Dey et al. | |
| 2005/0044056 A1 | 2/2005 | Ray et al. | |
| 2005/0044105 A1 | 2/2005 | Terrell | |
| 2005/0128318 A1 | 6/2005 | Leow et al. | |
| 2005/0182759 A1* | 8/2005 | Yuen | 707/3 |
| 2005/0223031 A1 | 10/2005 | Zisserman et al. | |
| 2005/0223034 A1 | 10/2005 | Kaneko et al. | |
| 2005/0271304 A1 | 12/2005 | Retterath et al. | |
| 2006/0082662 A1 | 4/2006 | Isaacson | |
| 2006/0271594 A1 | 11/2006 | Haberman | |
| 2007/0044010 A1* | 2/2007 | Sull et al. | 715/500.1 |
| 2007/0199031 A1* | 8/2007 | Nemirofsky et al. | 725/88 |

* cited by examiner

FIG. 5

| L.D | S.F. | W.P. |
|---|---|---|
| VIDEO LINK | KEYWORDS | S.F. |
| OBJECT LINK | | L.D. |
| OBJECT LINK DESCRIPTOR | | |
| EXTERNAL LINK | | |

SYSTEM AND METHOD FOR ENABLING OBJECTS WITHIN VIDEO TO BE SEARCHED ON THE INTERNET OR INTRANET

BACKGROUND OF THE INVENTION

1. Field of the Invention

The present invention relates to a method and system for associating keywords with objects in a video file so that the keywords are searchable on the internet by existing search engines.

2. Description of the Related Art

It is desirable to be able to locate videos that a user wants to watch based on a key word search. It is also desirable to search for video clips that contain certain objects in the clip. Methods of searching for videos in a large database or on the internet using keywords are well known in the art.

U.S. Pat. No. 6,925,474 to McGrath discloses a system of searching a database for videos containing certain objects and attempting to isolate only the portions of the videos that contain that object. The method uses the audio track to search, e.g., by searching the closed caption text or by first converting the audio track to text using a voice recognition program, e.g., akin to DRAGON NATURALLY SPEAKING® or the like. McGrath does not track objects. McGrath also does not attach hyperlinks to objects within the video. Moreover, McGrath is searching existing words in the video, not keywords for objects. Further, the audio track text will not necessarily correspond to the portion of the video showing a desired object. The object may only be mentioned once, and not necessarily at a beginning and ending frame containing the object. In fact, the object may not even be mentioned at all in the audio text.

There have also been patents on tracking objects throughout video clips and hyperlinking them to more information about that object such as U.S. Pat. No. 6,642,940 to Dakss. However, no search method for such an object is disclosed. A complete system that enables an intranet or internet user to link to the object by keyword searching is needed.

SUMMARY OF THE INVENTION

In one embodiment, videos are first reviewed by frame. Objects that are desired to be made searchable are identified. Each such object is tracked, by an object tracking software application, through each frame throughout the length of the content. Optionally, hyperlinks may be applied to any number of objects as desired. Then, each object is described by an "object descriptor," which is then used to generate keywords or keyword phrases concerning the object and the keywords or phrases or a link to the keywords or phrases, data concerning the location of the video, a web server and the object within the video, and any desired external link(s), are stored in an XML file or other file format capable of storing such data, along with the object descriptor. The keywords or keyword phrases are, if necessary, converted to and stored in a format which is searchable by existing search engines. (As used in this application, keywords includes or may include keyword phrases.)

A web page is created, potentially for each object and keyword (including keyword phrases), and are posted thereto along with the data in the XML file or a link to the XML file. In this way, a search engine's crawling function will find the web page and the keywords posted thereto. Preferably, the web page is a phantom page, i.e., the web page never appears to the internet user yet may be found by search. That is, the information returned in the search to the user provides, from the XML file, a link directly to the video server where the video is stored that corresponds to the keyword(s) searched by the user on a search engine. The information stored on the web page or associated therewith associates the keywords with that video and the XML file containing the object segment, i.e., start and stop frame of the video where the object appears, and any external (further) links from that object, and the location of the video server containing the video.

Preferably, there is one web page for each searchable object within a video, although multiple XML files for multiple objects and/or for multiple videos could be stored on a web page by segmenting the keywords for one video object segment from the keywords for another video object segment.

When a user searches the internet or a database by entering keywords, an object that appears in the videos associated with those keywords will have its link appear within the search results as a description of the link. The links shown are cued to the first frame that the object appears in and end at the last frame that the object appears in. The entire video is not and need not be downloaded or viewed but may if the user desires it.

In a more preferred embodiment, the user can click on the objects within the video and be hyperlinked to further information about the object, to a related web site, and/or to further video, or any linkable item.

BRIEF DESCRIPTION OF THE DRAWINGS

FIG. 5 is a chart showing various data generated and stored in the system of FIG. 1;

DESCRIPTION OF THE PREFERRED EMBODIMENT(S)

In one preferred embodiment of the invention, the method includes identifying one or more objects in a video, and for each such object, tracking the object to determine the initial and final frames in which each such object appears, such as by time code data, associating such objects with object link descriptors, generating a set of keywords from the link descriptors, and storing this object data (video server location for the video, object first and last frame data for all appearances, object link descriptor, and keywords, or keyword link data) in a file, preferably an XML file. Optionally, links may be attached to the objects by e.g., also storing the linking data in the XML file in association with the object. Preferably, the keywords are posted to a web site in a language (e.g., HTML, CSS, etc.) which is searchable by a standard search engine. Such a web site may be a phantom web site, never seen by the user, or an existing or new site. A user searching on the search engine for words, phrases or terms that are within the set of keywords associated with the object will be able to link directly to the video, cued to the segment containing the object, by clicking on the search results link or links.

The invention is described with respect to the interne. However, the method may be applied to an intranet or database.

It should also be noted that in the method and system described herein, the word "object" in a video refers to a table, chair, person, article of clothing or other visible thing in a video frame, and is not the same as the word "object" as it is sometimes used in searchable database terminology referring to an item of data stored in the database, such as a document, or image, and one may enter many different fields to describe different aspects of the document or image, such as author name, subject matter, date of creation, a keyword, topic, etc., and then be able to enter a search criterion (or criteria) on such different aspects and pull up all the documents and/or images that correspond to the search criterion. In the case of such a database, sometimes the various fields or aspects contain entries created from a drop down menu, and other times such fields contain entries that are manually determined and entered by the user.

Figure 1:
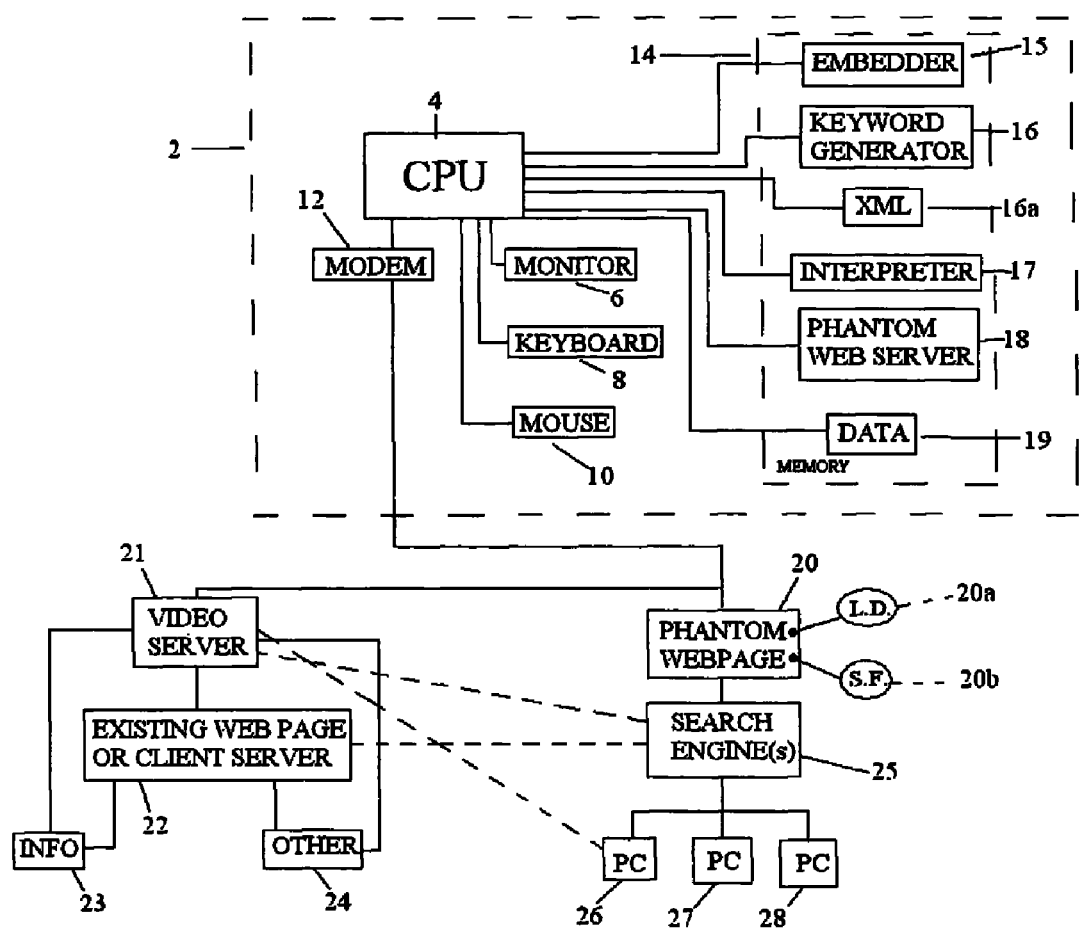
FIG. 1 is a schematic view showing a system for searching for objects within a video by means of a search engine, in accordance with a preferred embodiment of the present invention.
Figure 2:
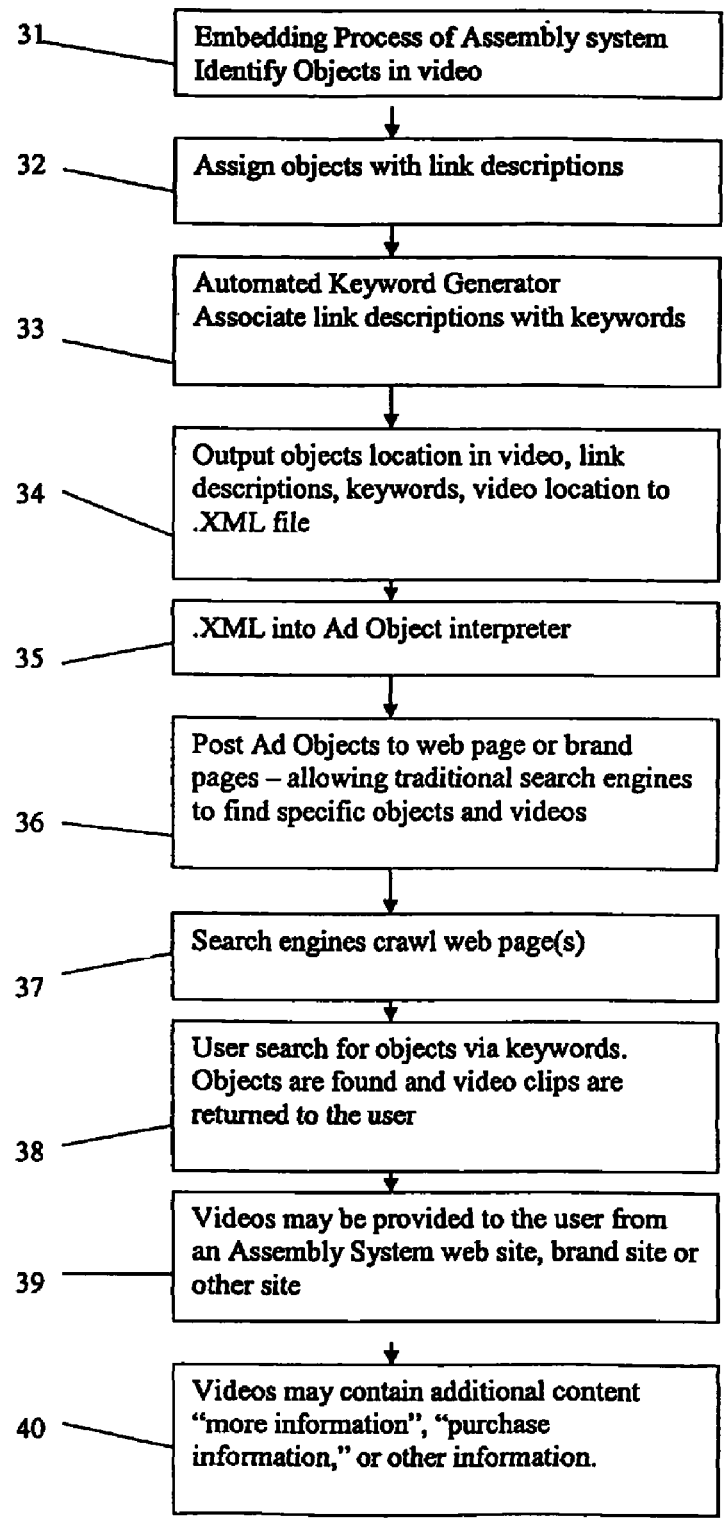
FIG. 2 is a flow chart showing steps in the system of FIG. 1.

With reference to FIGS. 1 and 2, there are typical computer components in a workstation 2 for identifying objects in video to have keywords associated therewith, an optionally to have further hyperlinks associated with the objects. The workstation has a CPU 4, monitor 6, keyboard 8, mouse 10, and modem 12 for internet access.

There is a memory 14 which may be any type of memory capable of storing software applications and data of the type disclosed herein, and may be one memory or multiple memories. The software applications are preferably an embedder application 15, a keyword generator application 16, an XML application 16a, an interpreter application 17, and a web server application 18. The applications 15, 16, 16a, 17 and 18 generate data, as explained below, which may be stored in a data memory section 19. These various sections of memory 14 are for assisting in a conceptual understanding of this embodiment of the invention, and any memory architecture that supports such applications and data me be used. In addition, the applications are separately described, but could be provided in one application having multiple modules, or several individual applications, or other suitable arrangement.

The computer 2 provides an assembly system for identifying objects in videos and generating searchable keywords with links to the videos in which the objects appear, cued to the segments of the video in which they appear. Optionally, hyperlinks from the objects to further web pages, information, videos, or other linkable items may be added.

Assembly Phase

Steps 31 to 36 of FIG. 2 show steps of an assembly process in accordance with a preferred embodiment. At step 31, an embedding process takes place which may be performed by the embedder application 15 of FIG. 1.

As a part of this step or as a preparatory step, a client or the assembler selects a video or multiple videos for processing objects therein to make such objects internet or intranet searchable. In the case of a clothing retailer, the retailer might want to make all shirts searchable, and so would select all videos containing shirts from its database, video server, or archives. Therefore, a video or videos, e.g., from a video server, are manually or automatically selected. An exemplary method of automatic selection could be selecting videos from all videos available on a designated server or servers, e.g., alphabetical order, sequential order or other selection method, e.g., all videos concerning "clothing," or "shirts," or all videos of a particular category, e.g., concerning "safety," or other selection method.

The data for where the video or videos are located is stored, e.g., in the data memory 19.

After selection of the video(s), a first object is selected or identified in the video. At this time, a first object identifier may be stored in data memory 19 as a mechanism to uniquely identify the object and store the data in association therewith. Preferably, the data is stored first in connection with the video location data, which will be unique. Then, any particular object can be described uniquely by time code and object descriptor, described below, or by assigning a unique object identifier, such as simple numbering of the object. Time code or time codes as used in this application may be represented or replaced with frame number or any other description of a frame location within a video.

The object, once selected, may be tracked using object tracking software to determine where the object first appears in the video and where the object last appears and all other appearances The time codes corresponding to the first appearance and last appearance (object location) in the video are recorded and stored, e.g., also in the data memory 19 in association with the video location and the first object. This time code, or other data to identify the video segment in which the object appears may be achieved manually, but is preferably automated, e.g., by a process disclosed in U.S. patent application Ser. No. 10/443,301, filed May 21, 2003, and published as U.S. Published Patent Application No. 2004/0233233, both incorporated by reference herein. This particular step of tracking the object may occur now or at another time in the process, before moving on to the next object in the video that is to be identified and processed as described herein.

In step 32, which may also be performed by the embedder 15 or by the keyword generator 16, the identified object(s) are provided with an object link descriptor, which is preferably manually assigned and entered into the software. The link descriptor is a word or phrase describing the object, such as "blue shirt," if the object is a blue shirt, or the particular brand model name of a car, if the object is a car. Additional descriptors, such as "car," "sedan," etc. may be manually added. The object descriptor is also preferably stored in the data memory in association with the object identifier.

At step 33, keywords are generated corresponding to each object descriptor, e.g., using the keyword generator 16 of FIG. 1. One of ordinary skill in the art can readily program the keyword generator, which would essentially be a thesaurus, other type of synonym generator and/or dictionary or partial dictionary (e.g., a program which functionally is like that available at www.dictionary.com) and which would preferably be updatable manually or automatically, e.g., based on data learned from search engine searches, of the type disclosed below, and/or based on manual entry of additional keywords or phrases.

The keyword generator would take the input text from the object descriptor stored in data storage 19 of FIG. 1, e.g., "blue shirt" and generate a group of keywords or phrases, such as the following keyword or phrase list for "blue shirt":

| | | |
|---|---|---|
| blue dress shirt | aqua shirt | blue blouse |
| blue formal shirt | aqua blouse | aqua top |
| blue polo shirt | blue top | blue outfit |
| blue button-down shirt | aqua outfit | light blue shirt |
| blue golf shirt | | |

The list could be further increased by substituting "azure," "royal," "navy" and/or other names for and/or shades of blue. If during use it were found that users searched for "rugby shirt" a lot, or a sponsor wanted to promote rugby shirts, then "blue rugby shirt" might be added manually or automatically to the list. The keywords or keyword phrases may also be stored in the data memory 19, in association with the Object Descriptor, or unique identifier for the object. A Link Descriptor, a link to the video and a link to the object in the Video by virtue of the time codes or equivalent means of cueing the video, as well as any links from the object, i.e., external links, are also stored in the data memory 19.

At step 34, the link descriptor, keywords or keyword phrases, object location (time code for beginning and ending frames for the object's appearance in the video), and location of the video containing the object, and any external link data, are processed by the XML application 16*a* by converting or simply storing this data, preferably in one XML file, or any other format capable of handling this data. At step 35, the interpreter application 17 converts the keywords including the link descriptor, in to a searchable file format such as HTML.

The keywords or keyword phrases, however, could have previously been generated in (as opposed to having to be converted into) a file format such as HTML or CSS (cascading style sheets), which is searchable by existing search engines. In any case, the XML file must be associated with the searchable keywords file.

At step 36, the interpreter application 17 or (phantom) web server application 18, contain well known software to post or attach the data, i.e., the XML file and the keyword file in searchable text, to a web page. The phantom web server 18 posts the web page on the interne (or an intranet). The web page may then be "crawled," i.e., the existing search engines, e.g., YAHOO!®, GOOGLE® and others, may send out "spiders" which "crawl" through each web site including the home web page, and any secondary web pages, and any hyperlinks to other sites or information, or other hyperlinked items, for the search engine to be able to provide links for these pages or items in response to search requests by users of the search engine.

At this stage, the assembly is complete.

Figure 3:
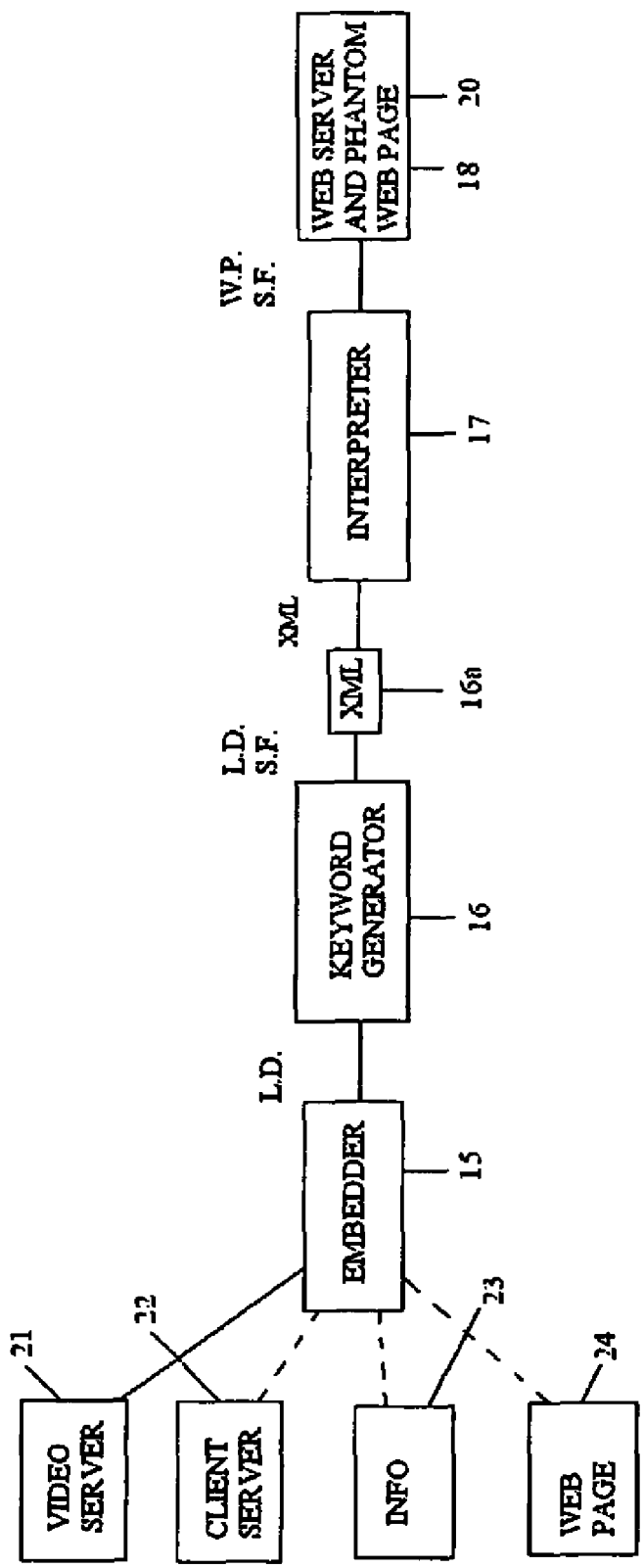
FIG. 3 is a flow chart showing details of a process of generating keywords associated with an object and posting them to a web page.

The assembly process is also schematically depicted in FIG. 3. The assembler company would start the process with the embedder software 15, typically, as an example, in response to a sponsor company or other client coming to the assembler. The assembler company may be available as a web-based service. The client would preferably already have in mind and thus provide the video source (video server 21), which could be an advertisement, infomercial, feature film, short film, etc., and would also preferably provide the client's own server, i.e., client server 22 for its own web site, the information file(s) location (info 23), e.g., safety test data on a car featured in an advertisement; and/or other hyperlinkable items (other web pages, data, videos, etc.), such as a web page where one could make an appointment to test drive such a car at one's local dealer, to obtain a quote for such a car, and/or to buy such a car. In addition, other hyperlinks might include links to pages where one could obtain or download a brochure concerning the car, or one could link to an advertisement for other model cars available from the sponsor.

The embedder 15 then outputs linking data L.D., shown in FIG. 5 as preferably consisting of or including a video link or video location data, an object link or object location data for the desired object(s), an object link descriptor, and if desired, any external links location data (for additional links from the object to further information, web page(s) etc.) The keyword generator 16 may receive or access the linking data L.D. and then from the link descriptor generates the keyword list in a searchable format. The keyword list in such format is denoted S.F. in FIG. 3 and FIG. 5. The searchable keyword list S.F. and linking data L.D. may be accessed by the XML application 16*a* to convert or store all the data and/or locations to the keyword list S.F. and linking data L.D. data, and the interpreter application 17 outputs data denoted as W.P. consisting of or including the location of the XML file containing the linking data L.D. (or actually consisting of or containing the linking data L.D.), and the searchable keyword list S.F. data.

Then, the file location data W.P. is posted on the web page denoted phantom web page 20 generated by the assembler's software at its phantom web site server 20, or an existing web page on the client's web server (client server 22), as desired.

Web Search Phase

Figure 4:
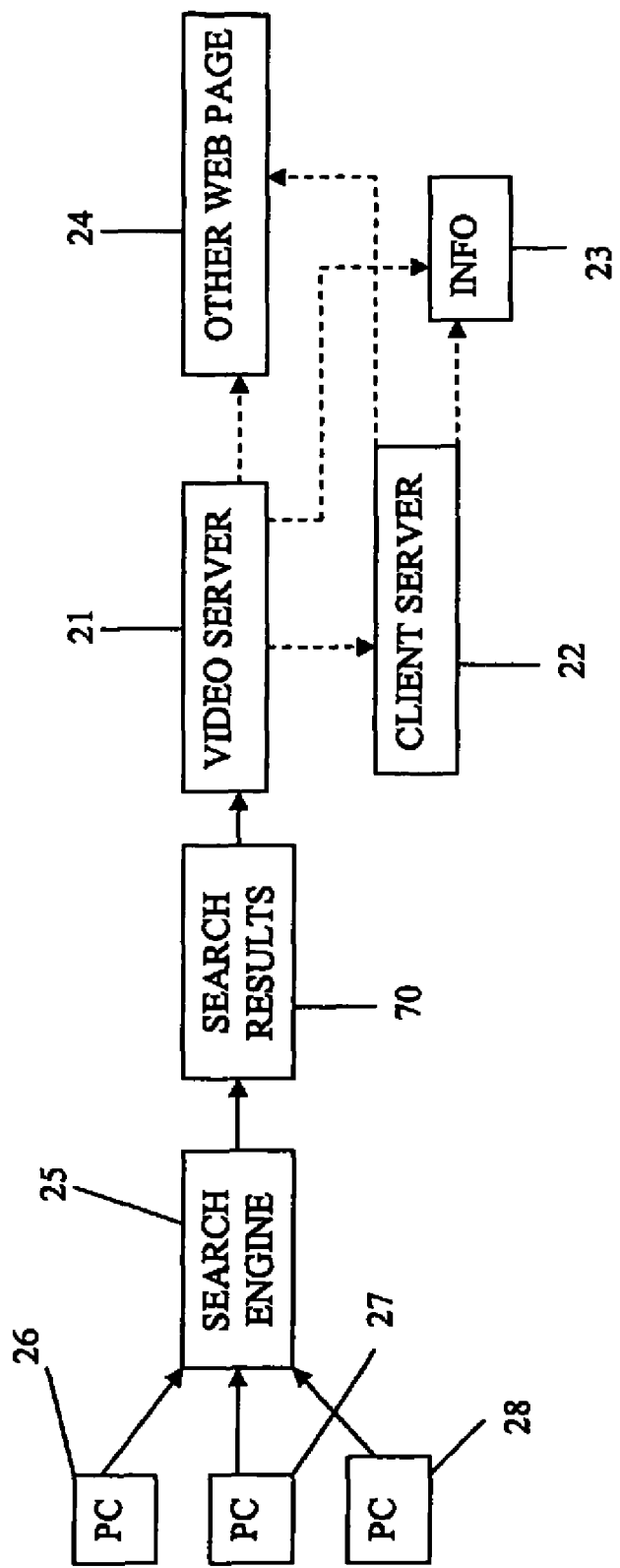
FIG. 4 a flow chart showing details of a process of a user searching the internet using the system in the preferred embodiment.

FIG. 4 shows the web search phase of a preferred embodiment of the invention, which phase may be described by steps 37-40 as shown in FIG. 2.

In step 37, existing search engines crawl the web and therefore would find phantom web page 20 (or the existing client server web site 22) containing the keywords and XML file. The keywords and XML file (with the object descriptor, video location, object time codes, and any external links) are then available for searches conducted by internet users shown, e.g., as having PCs 26-28 (personal computers) in FIGS. 1 and 4.

Figure 6:
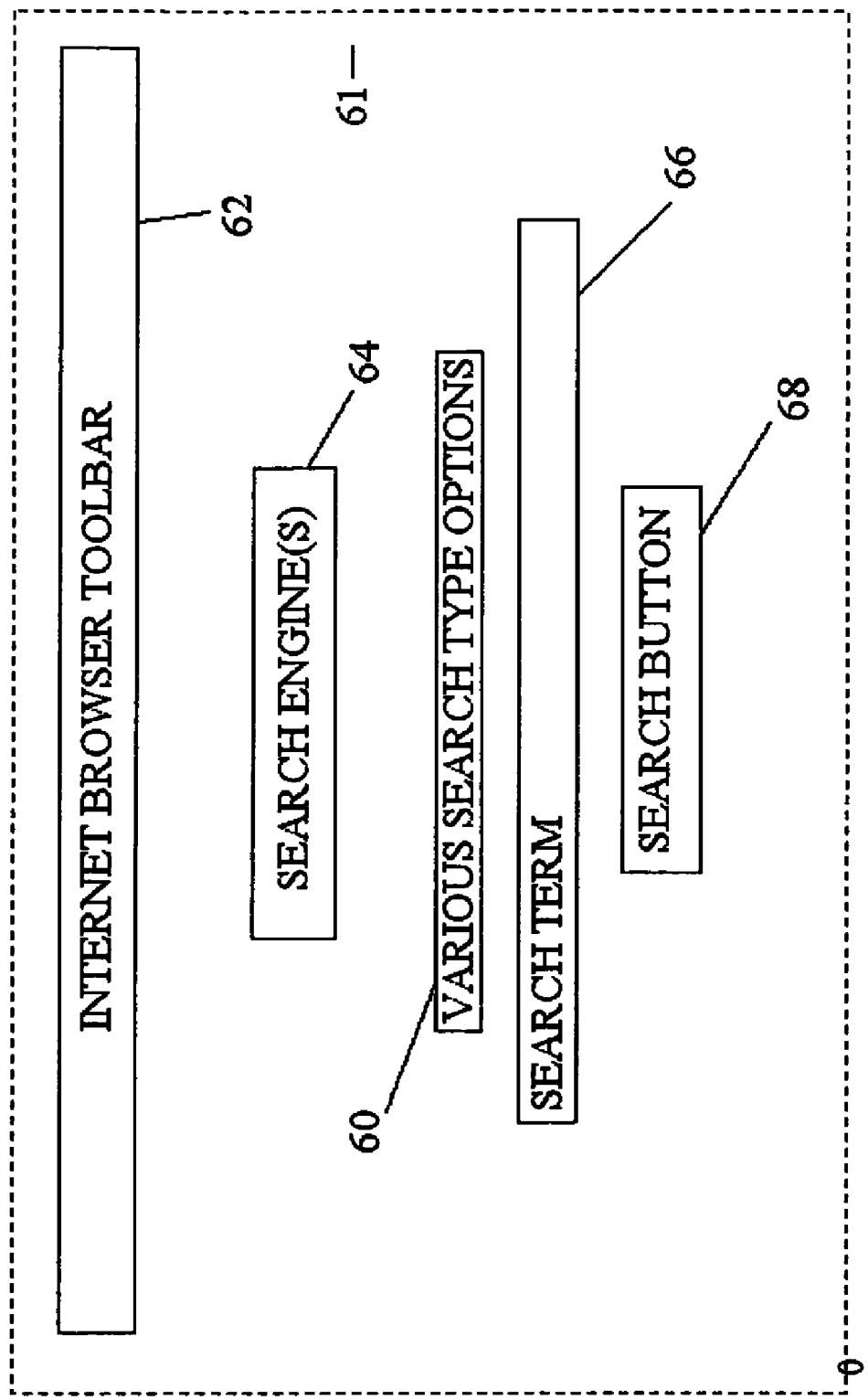
FIG. 6 is a schematic view of a computer screen showing an internet browser page for a search engine which may be used for searching in accordance with the system of FIG. 1.

At step 38, one or more internet users (PC 26-28) connect to the internet to a search engine page e.g., as shown by browser screen 61 of FIG. 6, and searches on keyword(s) or keyword phrase(s). Specifically, the PC user enters desired keyword(s) ("search terms") in the SEARCH TERM box 60 in their own internet browser application (e.g., Internet Explorer® or AOL®'s browser). The browser screen 61 typically has an internet browser toolbar 62 (which contains "File," "Edit," etc. drop down menus and various icons, such as arrows for back or forward), a search engine name and/or logo 64 (GOOGLE®, YAHOO!®, etc.), a variety of search options 66 (usually in the form of "buttons," "icons" or words or phrases, such as "advanced search," or other type of search), and a search button or icon 68. Clicking on button 68 performs the search on the search term(s) entered in box 60.

Figure 7:
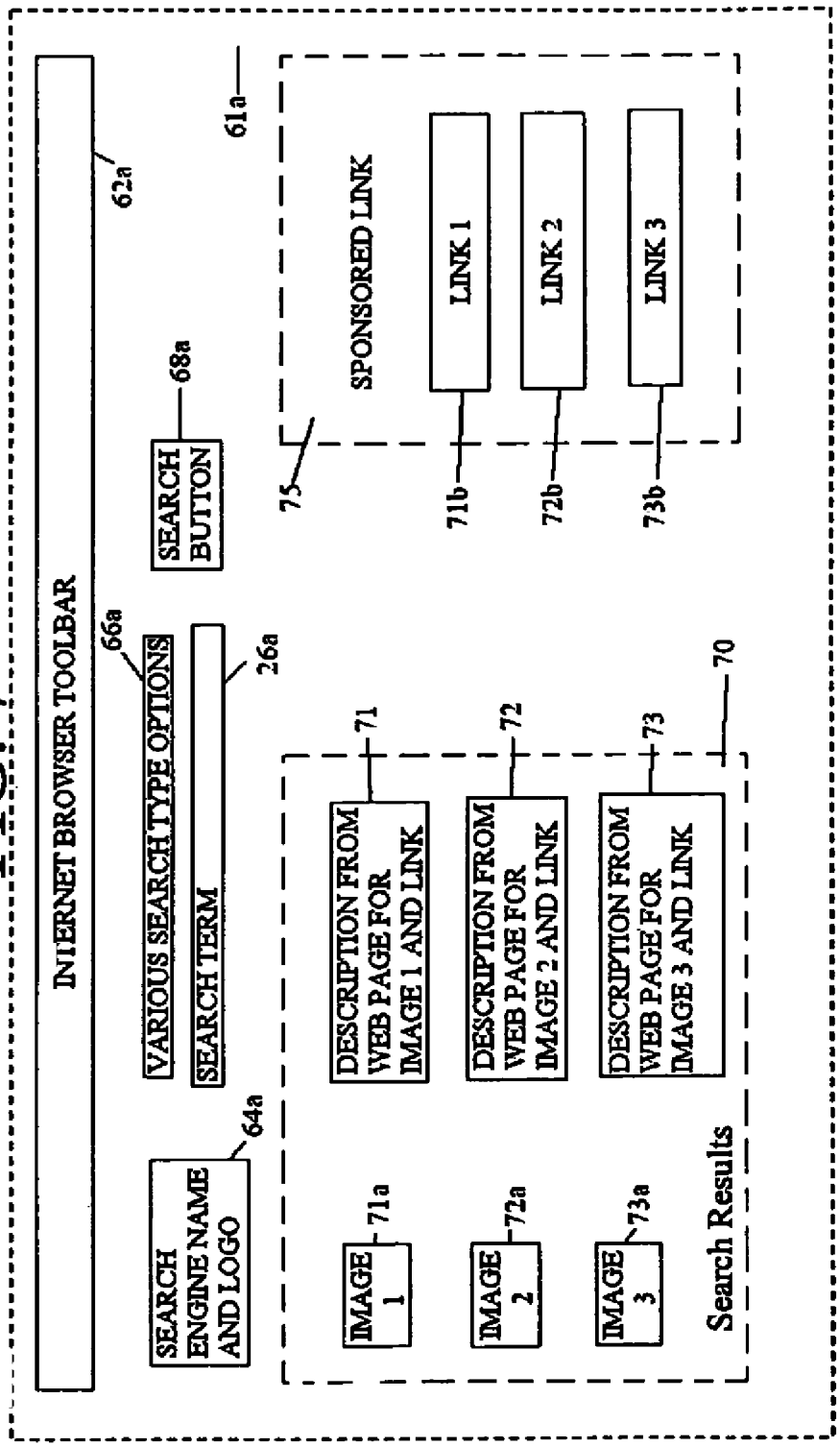
FIG. 7 is a schematic view of a computer screen showing an internet browser page with search terms and results after conducting a search on a search term on the search engine web page of FIG. 6.

In step 38, the search results are returned to the user's internet browser screen, e.g., as shown in FIG. 7. The results include the hyperlinks to the video(s) cued to the beginning and end of the video segment containing the object, and preferably the object descriptor and at least the keywords that match the user's search words.

The screen 61*a* showing the search results 70 normally contains multiple results. In FIG. 7, there may be a first search result 71 containing a description (usually generated by the search engine from the web page corresponding to the result), and containing the hyperlink. The hyperlink would go to the web page but automatically be routed by the phantom web page (or client server web page) to the video server. There may also be a first image 71*a* appearing adjacent the first search result with preferably, the first frame of the video where the object appears. The same would be true for any other search result from the phantom web page or client server/client web page, e.g., represented by search results 72, 73 and corresponding images 72*a*, 73*a*. There can also be search results from web sites other than those assembled in accordance with the present invention.

As on the browser screen 61 of FIG. 6, the browser screen 61*a* of FIG. 7 may have an internet browser toolbar 62*a*, a name and/or logo 64*a*, a search term box 60*a*, and a search button 68*a*, and other items, e.g., paid sponsor links 75, such as LINKs 1, 2 and 3 labeled 71*b*, 72*b* and 73*b*, respectively.

In step 40, the user may link from the object in the video to further web pages, (e.g., describing rugby shirts), information such as purchase information (e.g., how to purchase a blue rugby shirt), and/or another video, (e.g., about rugby shirts or showing rugby shirts).

Figure 8:
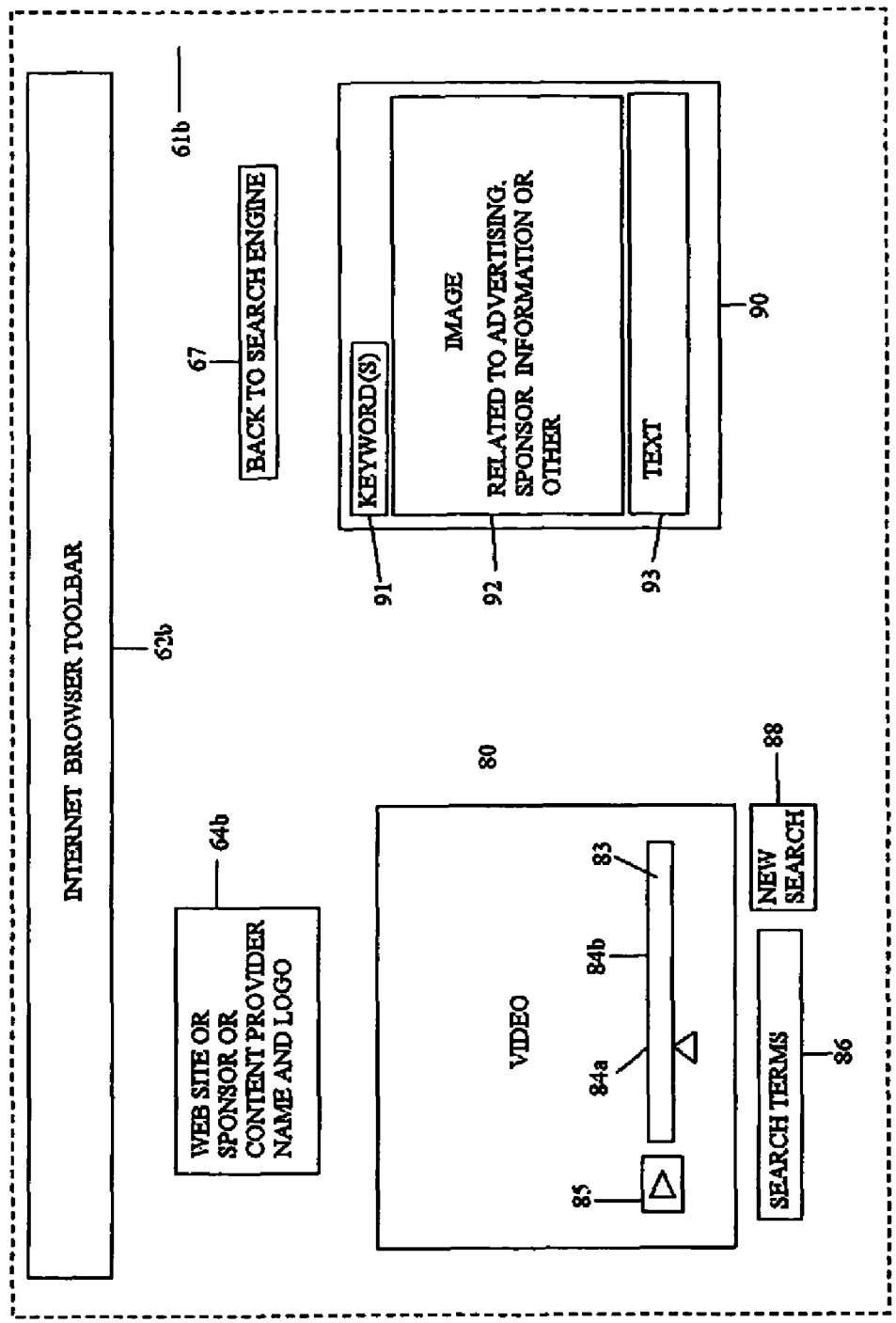
FIG. 8 is a schematic view of a computer screen showing an internet browser page for showing a video segment corresponding to one of the search results of FIG. 7.

As shown in FIG. 8, the internet browser screen 61*b* again shows an internet browser toolbar 62*b*, a name and logo 64*b* (which may be the web site owner, assembly system, content provider, or client server), a back button 67, a video player subscreen 80 showing video, corresponding to last frame 84*b* of the video segment from the video provider by the video server in response to the PC user 26, 27 or 28 clicking on the selected search result 71, 72 or 73. A play button 85 is also typically displayed by a video player (e.g., Quick Time® or Real Player® video players, or the like).

Also, a new search may be conducted, using search terms inputted to box 86 by the user, and clicking the new search button 88. The new search, however, is preferably limited to the sponsor's or client's server, or the assembler's server. Another subscreen 90 may be provided having keyword(s) in a box 91, an image and/or text with a hyperlink in box 92, and a caption or text box 93. For example, if the object in the video 80 is a blue shirt, the keyword(s) 91 may be "clothing," the image 92 may be a matching pair of slacks, and the text 93 may be "these casual slacks would go well with a blue rugby shirt," or the like.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A method of making an object within a video segment of a video searchable by keyword or keyword phrases on a network having at least one search engine that searches on keywords, the method comprising the steps of:

viewing at least a video segment of the video;

electronically selecting at least one physical object appearing within a plurality of frames of the video segment by clicking on the object;

tracking the selected object through each frame of the video segment;

determining (i) a first video frame of the video segment in which the selected object first appears and (ii) a last video frame of the video segment in which the selected object last appears;

determining (i) object location data describing a location of the selected object within the first video frame and the last video frame of the video segment in which the selected object appears and (ii) video server location data for the video segment;

determining an object link descriptor in words for the selected object and associating the object link descriptor with (i) the video location data and (ii) the object location data;

providing a clickable hyperlink for the selected object;

generating a plurality of keywords associated with the object link descriptor;

storing (i) the video server location data, (ii) the object location data, (iii) the object link descriptor, (iv) the keywords, and (v) the selected object clickable hyperlink, in a computer memory in a computer file associated with the object; and posting on a phantom web page, which is not visible to a user, (i) the stored keywords in a search-engine-searchable language, and (ii) computer file information corresponding to the stored video server location data, object location data, object link descriptor, and the selected object clickable hyperlink.

2. The method of claim 1 wherein the step of determining location data for the object in a frame of a video is accomplished using computer software, and the keywords are automatically generated.

3. The method of claim 2 wherein the object is tracked throughout the rest of the video using its characteristics to locate the object in each frame.

4. The method of claim 1 further comprising a step of providing in the computer file hyperlink location data for at least one hyperlink from the object to at least one of information, another web page, another object, another video, an image and a sound file.

5. The method of claim 1 wherein in the step of determining an object descriptor in words, the object descriptor is determined by selecting at least one word as the object descriptor which is descriptive of the object that was viewed and selected in the step of viewing a video segment, and the step of generating keywords is performed automatically from the object descriptor.

6. The method of claim 1 wherein in the step of storing data, the data is stored in an XML file.

7. A method of making video segments containing an object within a video searchable by keyword on the internet having at least one search engine that searches on keywords, the method comprising the steps of:

viewing at least a video segment of a video;

electronically selecting at least one visible object appearing within a plurality of frames of the video segment by clicking on the object;

tracking the selected object in each frame of the video segment;

determining (i) a first video frame of the video segment in which the selected object first appears and (ii) a last video frame of the video segment in which the selected object last appears;

determining (i) object location data describing a location of the selected object within the first video frame of the video segment in which the selected object first appears and the last video frame of the video segment in which the selected object last appears, and (ii) video server location data for the video;

determining an object descriptor in words for the selected object and associating the object descriptor with both the video server location data and the object location data;

generating plural keywords associated with the object from the object descriptor;

providing a clickable link for the selected object;

storing in a computer memory in a computer file associated with the object: (i) the video server location data, (ii) the object location data, (iii) the object descriptor, (iv) the keywords, and (v) the selected object clickable link; and posting (i) the keywords in a search-engine-searchable language on a phantom web page, wherein the phantom web page itself is not viewable on the internet, and (ii) computer file information corresponding to the stored video server location data, object location data, object link descriptor, and the selected object clickable link.

8. The method of claim 7 further comprising a step of searching the internet for search terms sufficiently matching at least one of the object descriptor and set of keywords to provide search results including a link to the video segment containing the object.

9. The method of claim 7 wherein in the step of locating the object, software is used to locate the object in each frame in which the object appears including a frame in which the object first appears and a frame in which the object last appears.

10. The method of claim 8 further comprising a step of cuing any videos that appear in the search results that contain the object to begin playing where the object first appears.

11. A method assigning keywords to objects that are tracked through a video and hyperlinked to web pages with additional information related to the object for use with searching video databases, comprising the steps of:

viewing at least a video segment of a video;

electronically selecting at least one visible, physical object appearing within plural frames of the video segment, by clicking on the object;

tracking the selected object throughout each frame of the video segment;

determining (i) a first video frame of the video segment in which the selected object first appears and (ii) a last video frame of the video segment in which the selected object last appears;

determining (i) object location data for the selected object within the first video frame and the last video frame of the video segment in which the object appears and (ii) video server location data for a location of the video segment;

providing at least one clickable hyperlink associated with the object;

determining an object link descriptor in words and associating the object link descriptor with (i) the video location data for the video segment and (ii) the object location data for the object;

generating plural keywords associated with the object from the object link descriptor;

storing, in a computer memory in a computer file associated with the object: (i) the video server location data, (ii) the object location data, (iii) the object link descriptor, (iv) the keywords, and (v) the selected object clickable hyperlink; and posting on a phantom web page, which is not visible to a user: (i) the keywords or keyword phrases in a search-engine-searchable language on a phantom web page, and (ii) computer file information corresponding to the stored video server location data, object location data, object link descriptor, and the selected object clickable hyperlink.

12. The method of claim 11 wherein the user can search the internet or any other database for videos containing certain objects so that when the search terms used match the keywords assigned to an object in a video the results will include that video.

13. The method of claim 12 wherein, when the search results indicate a video, that video is automatically is cued to begin playing at said first frame.

14. The method of claim 13 wherein the person watching the video can click on the object within the video and be linked to a website containing further information on the object.

15. The method of claim 14 wherein the further information comprises at least one of product information, pricing information, further advertising or any other information related to the object.

16. The method of claim 13 further comprising a step of automatically ending playing of the video segment at said last frame.

17. The method of claim 10 further comprising a step of automatically ending playing of the video segment at said last frame.

18. The method of claim 1, wherein the selecting step includes the step of selecting plural objects, and wherein the posting step includes the step of posting a phantom web page for each of the selected objects.

19. The method of claim 1, wherein the providing a clickable hyperlink step includes the step of providing a clickable hyperlink in each frame of the video segment.

20. The method of claim 7, wherein the selecting step includes the step of selecting plural objects, and wherein the posting step includes the step of posting a phantom web page for each of the selected objects.

21. The method of claim 7, wherein the providing a clickable hyperlink step includes the step of providing a clickable link in each frame of the video segment.

22. The method of claim 11, wherein the selecting step includes the step of selecting plural objects, and wherein the posting step includes the step of posting a phantom web page for each of the selected objects.

23. The method of claim 11, wherein the providing a clickable hyperlink step includes the step of providing a clickable hyperlink in each frame of the video segment.

* * * * *